Figure 18:
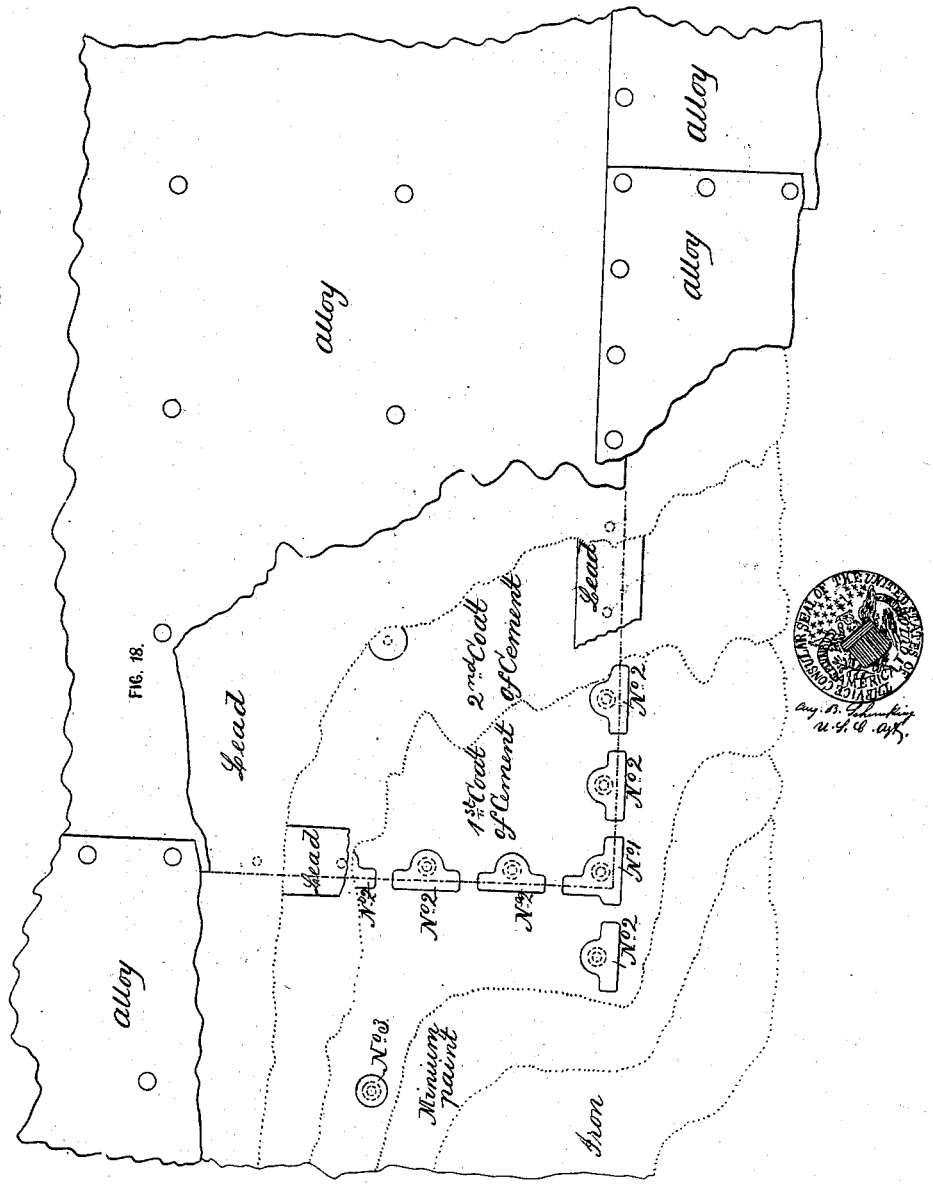

F. L. Roux.
Armor Clad.
Nº 68,110. Patented Aug. 27, 1867.
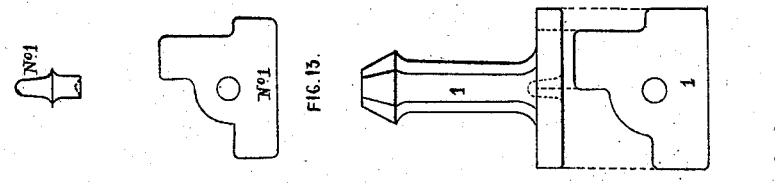
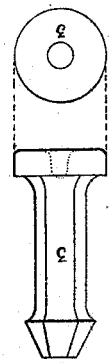
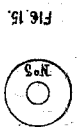
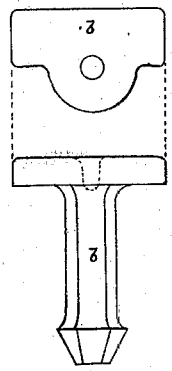
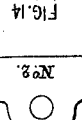
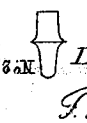
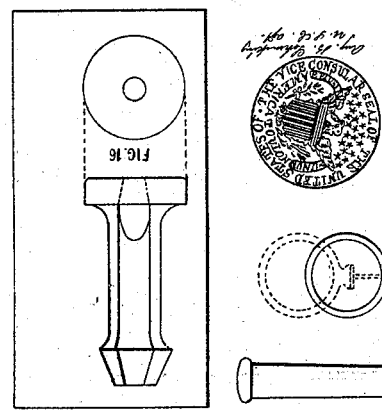
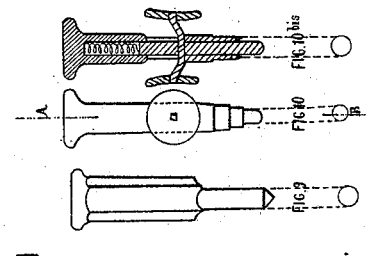
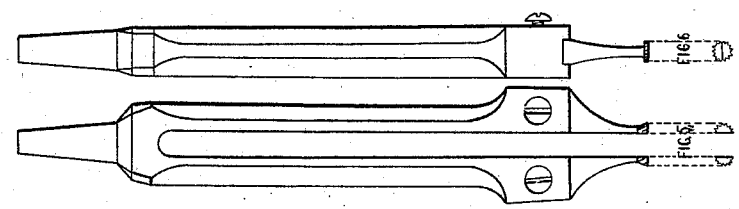
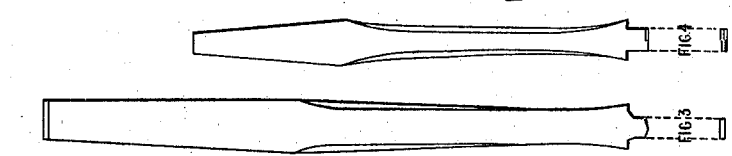
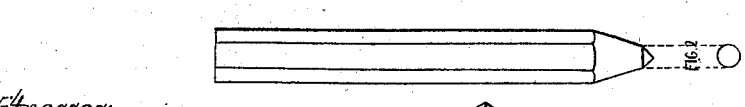
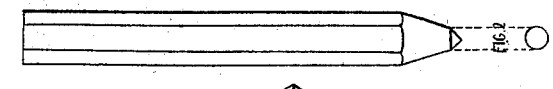
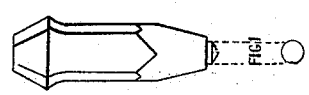
Witnesses;
Inventor;
F. L. Roux

F. L. Roux.
Armor Clad
Nº 68,116. Patented Aug. 27, 1867.
Sheet 4, 8 Sheets.
FIG. 17
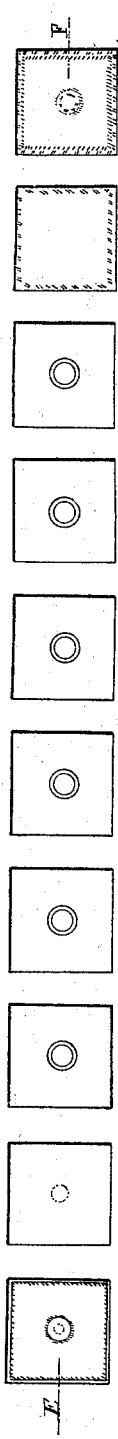
FIG. 17 bis
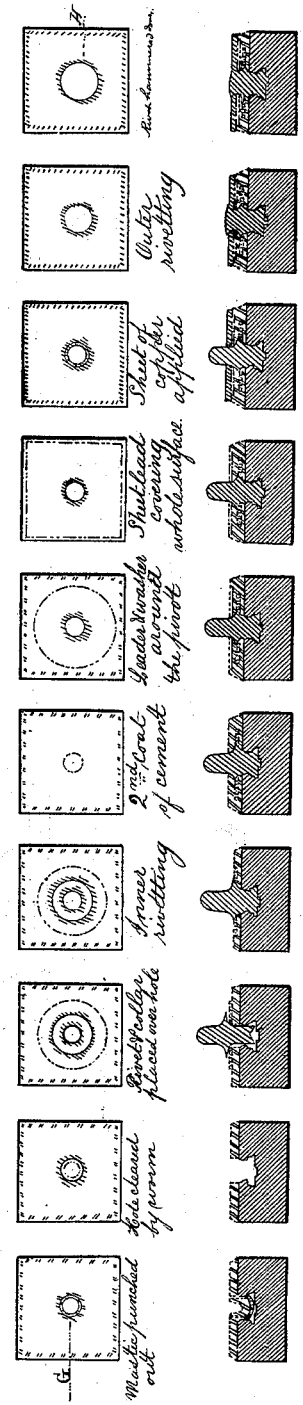
Witnesses:
Inventor;
F. L. Roux F. L. Roux.
Armor Clad.
Nº 68,116. Patented Aug. 27, 1867.
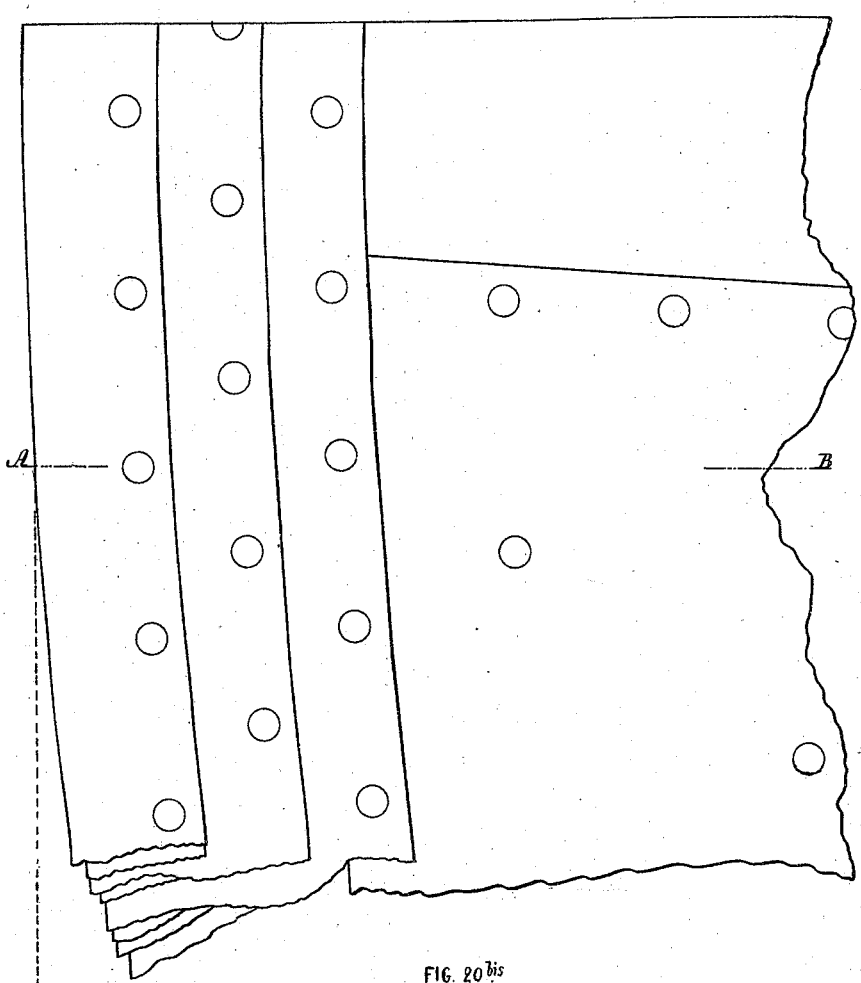
FIG. 20.
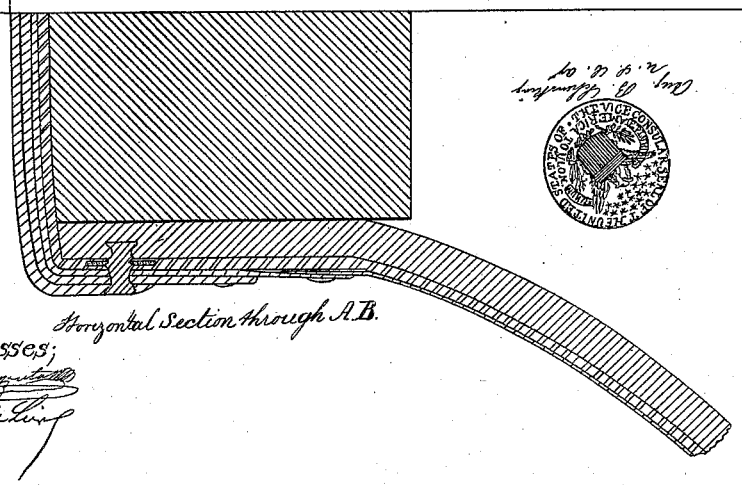
FIG. 20 bis
Horizontal Section through AB.
Witnesses;
Inventor;
F. L. Roux

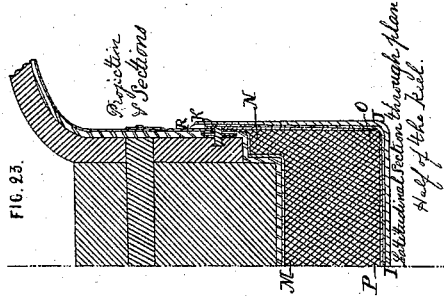
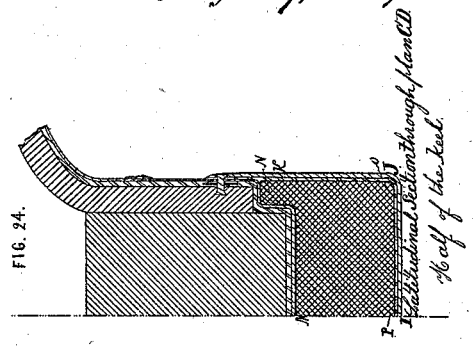
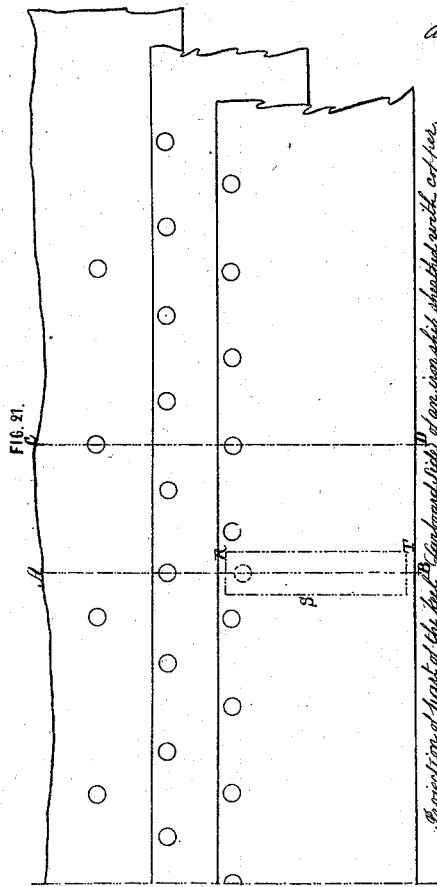
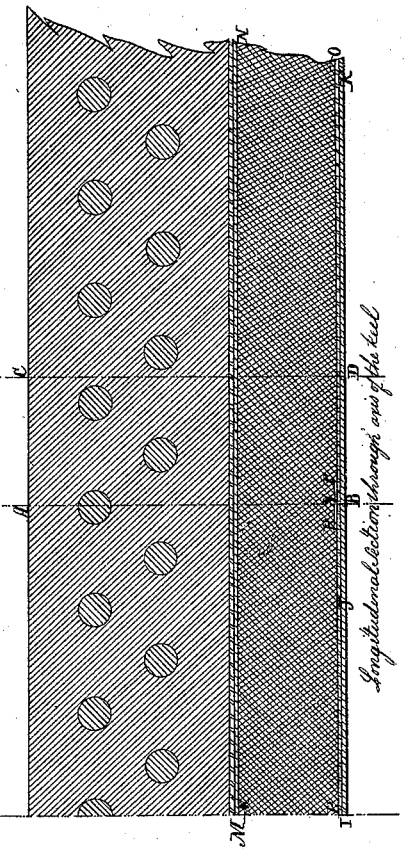

Sheet 7, 8 Sheets.
F. L. Roux.
Armor Clad.
No. 68,116. Patented Aug. 27, 1867.
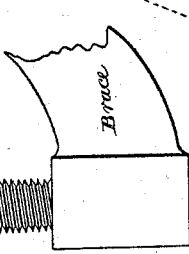
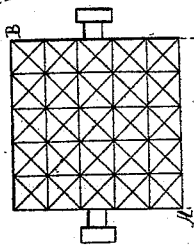
Witnesses:
Inventor:
F. L. Roux

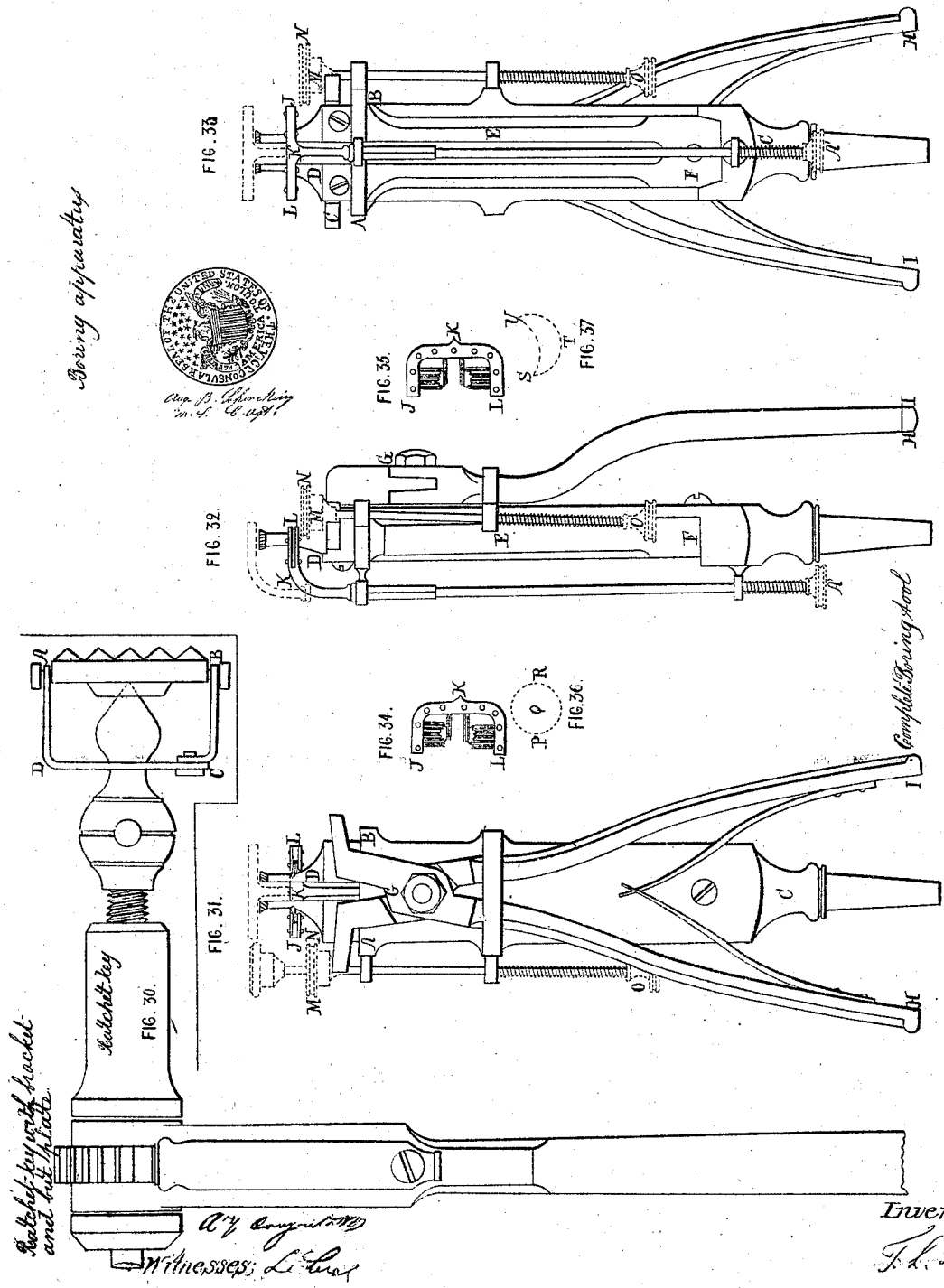

United States Patent Office.

FRANCOIS LOUIS ROUX, OF TOULON, FRANCE.

Letters Patent No. 68,116, dated August 27, 1867; patented in France January 23, 1866.

---

IMPROVEMENT IN THE SHEATHING OF SHIPS' BOTTOMS.

---

The Schedule referred to in these Letters Patent and making part of the same.

---

TO ALL WHOM IT MAY CONCERN:

Be it known that I, FRANÇOIS LOUIS ROUX, of Toulon, in the Empire of France, Captain in the Imperial Navy, and Officer of the Legion of Honor, have invented "certain new and useful improvements in the Mode of Applying Copper Sheathing to Ships constructed of or plated with iron;" and I do hereby declare that the following is a full, clear, and exact description thereof, reference being had to the figures of the annexed drawings, making a part of this specification; that is to say—

My invention relates to a peculiar mode of applying copper sheathing to iron and iron-plated ships or vessels, in combination with insulating material for the prevention of voltaic action between the two metals.

Preliminary Operations.

The portions of the hull intended to be sheathed are first carefully cleaned and dressed, so as to clear off all traces of oxide of iron, all the cavities existing therein being also cleared out, and stopped with minium cement. This done the surface is covered with a coat of minium paint. The sheets of copper are then adjusted to the positions they are intended to occupy on the vessel, and are afterwards shaped by means of a shearing apparatus, the rivet holes being marked off at the desired points, and thereafter punched out in the ordinary way. The sheathing is then temporarily attached to the hull, and the centre of each rivet hole is marked on the latter by the pointer, shown in Figure 1. This done, it is withdrawn, and the traces of the pointer are enlarged by the punch, Figure 2, so as better to determine the centre of the hole, and to facilitate the piercing, which is afterwards effected by the boring-bits, Figure 3. The holes thus pierced, being brought to uniform diameter by the opening bit, Figure 4, set in a suitable brace, are countersunk by means of the spring branch tools, seen in Figures 5 and 6. These tools, the extremities of which are closed by pincers, are successively worked in the holes in the same manner as the opening bit, each operation being indicated by a distinct external sign, so as to avoid the possibility of error. The centre of each hole is then finished off by the tool, Figure 7, and is stopped by the frieze or other similar washer R O, Figure 8, after which a second coat of minium paint is applied to the whole surface.

Application of the Insulating Material.

The operations above described being completed, the hull is covered to the depth of say about one-eighteenth ($\frac{1}{18}$) of an inch, with any suitable insulating material, which should, as far as possible, be possessed of plastic, adherent, and elastic properties, combined with inalterability when exposed to the action of sea-water.

The compound known as Roux's cement, fulfilling as it does the above conditions, is perfectly adapted to the purposes of the present invention.

In order to ascertain and clear out the rivet holes concealed by the cement, the sheets of copper are again set in position, and the piercer, Figure 9, is forced through the cement at the points corresponding with the punching. In the cavity formed by this piercer is driven the punch, Figures 10, 10 bis, by which the cement is cut out from the hole down to the washer R O, set at the bottom, and the holes are finally cleared out by the double worm, shown in Figure 11.

Application of the Rivets and Sheathing.

Figures 12, 12 bis, represent the details of the rivets and corresponding setting-tool. The rivets are formed of copper, and are composed of the head P, the collar Q Q', and the casement R, hollowed out below. Under the collar Q Q' is set a washer, M N, made from an alloy of seven parts of tin to three parts of lead. The head of the rivet is inserted in the cavity of the setting-tool S T U, and the stalk, being passed into the hole pierced in the hull, is secured by hammer strokes applied to the head of the tool. In this operation the metallic washer M N sinks into the cement, while the collar Q Q' sinks into the washer, thus forming a perfectly water-tight adjustment.

As a further precaution against the admission of the sea-water, which alone can give rise to destructive voltaic action, a second coating of cement is applied to the hull, so as to cover the entire surface, with the exception of the rivet heads. If so desired, the rivets above described may be replaced by copper or other metallic screws. The length of these rivet heads, as also the form of the metallic washers and setting-tools, is variable, according to the position occupied by the rivet in the sheathing, but the length of the stalk remains always the same. At those points of the sheathing where three sheets of copper are in juxtaposition I make use of the rivet, washer, and setting-tool represented in No. 1, Figure 13. When two sheets only are in question I employ the rivet, washer, and tool shown in No. 2, Figure 14. The rivet, washer, and tool shown in No. 3, Figure 15, are specially intended for the holes formed in the interior of the sheets. The rivets situated on the overlapping line of the sheathing are covered with a thin strip of lead, and each middle rivet is fitted with a leaden washer of about one-fiftieth ($\frac{1}{50}$) of an inch in thickness, previously pierced at the centre. The strips are pierced when being set in position by the tool-sharer, in Figure 16. Both strips and washers are made to adhere to the cement by a hot mixture of eight parts of vegetable tar to two parts of dry pitch. The surfaces thus prepared are then covered with large, thin sheets of lead or other malleable metal, which are made to adhere by the same means as the leaden strips above mentioned. Finally, each sheet of copper is set in its place, commencing at the top of the after part of the hull, and the rivet heads are closed down in the ordinary way.

In order to render perfectly intelligible the action of the tools in the different processes above described, I refer to Figures 17, 17 bis, which show, in plan and vertical section, the successive transformation of one of the middle rivet holes, from the first stroke of the pointing-punch down to the final heading and closing down of the rivet.

Figure 18 represents on a scale of one-half a portion of the sheathing of an iron vessel constructed of plates set edge to edge. In this plate the successive operations are so clearly defined as to dispense with the necessity of detailed description.

Figure 19:
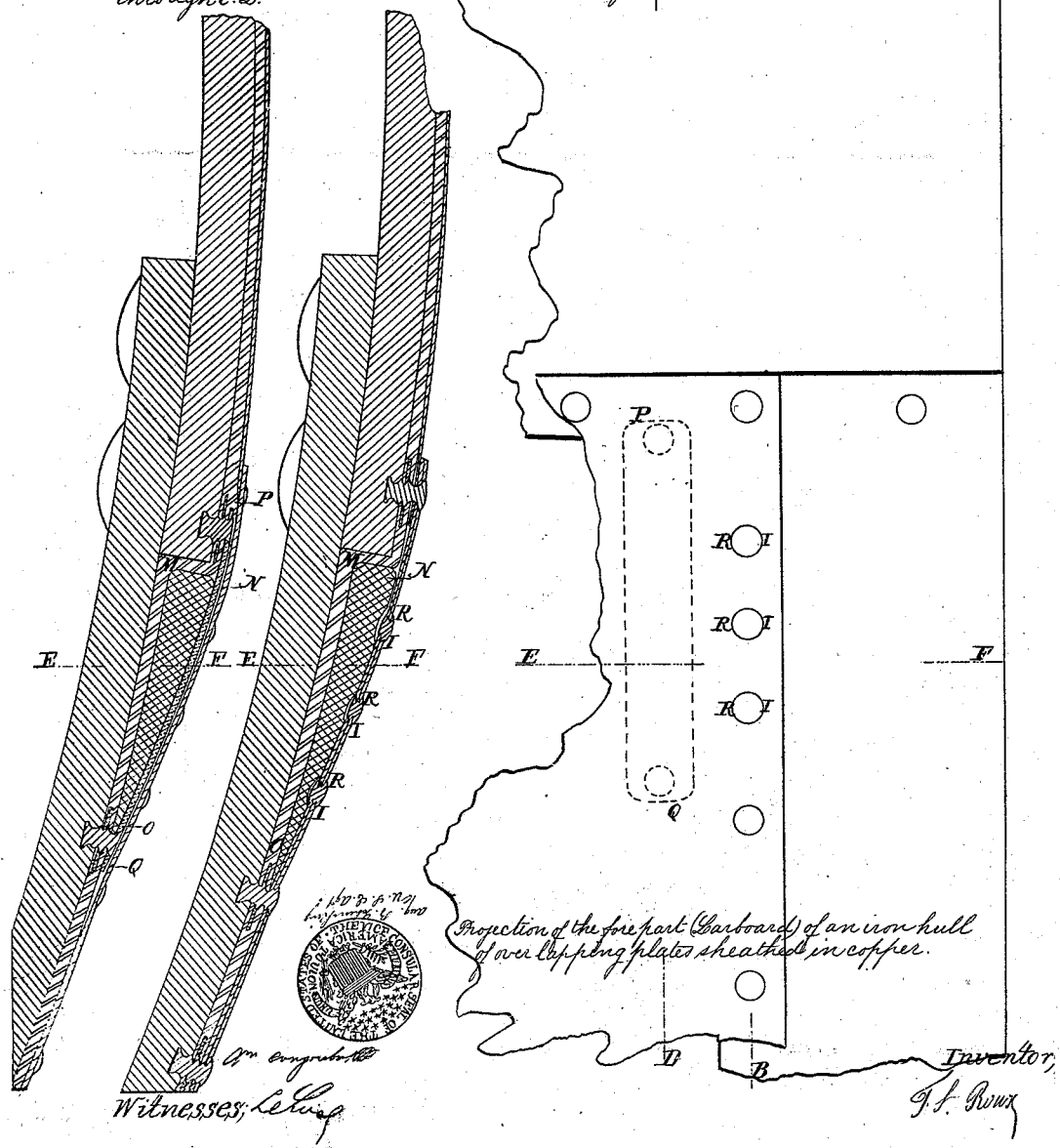

As a matter of course, the most perfect adjustment of the sheathing is obtained on vessels constructed of plates set edge to edge, but as this mode of construction involves additional cost and weight I have endeavored, as hereafter described, to remedy the disadvantages resulting from the overlapping of the metal of the hull. To this end I adapt to each seam, Figures 19, 19 bis, a series of wooden laths of prismatic form, M N O, set end to end, and secured to the hull by strips P Q of the soft metallic alloy before mentioned, spaced by about twenty inches from each other. These laths are covered with cement and sheet lead, over which is placed the sheet of copper, which is fixed by the rivets R I to the parts corresponding with the wooden fittings.

The hulls sheathed by this process present an undulating surface, which, however, offers less resistance to fluids than the edges of the overlapped plates. When so desired, the rivets above described may be substituted by a certain number of ordinary rivets at the overlapping lines of the sheathing, by which means the workmanship may be considerably reduced without affecting the solidity of the structure.

*Armor-Plated Vessels.*

The hulls of armor-plated vessels constructed of iron are treated in the same way as above described for ordinary iron-plated ships, extreme care being taken in coating with cement the upper surfaces of the streaks and the interstices of the plates, so as to prevent infiltration of the water from within. With wooden hulls the sheathing is applied to the armor plating from about three feet above the water line to about four or six inches below the armor under water, beyond which the sheathing is continued over the bottom in the ordinary way. As in iron hulls, the horizontal and vertical seams formed by the plates are carefully caulked and coated with cement, which should even extend over the two first streaks next the armor.

*General Details applicable to Hulls of every Description.*

The rudder and braces, as also the screws of iron vessels intended to receive copper sheathing, should be constructed of cast bronze. The main piece may be formed of wrought iron, from about three feet above the water-line. The stem should be covered with two or three superposed sheets of copper of say one twenty-fifth, ($\frac{1}{25}$,) one-twelfth, ($\frac{1}{12}$,) and one-fifth ($\frac{1}{5}$) of an inch in thickness, Figures 20, 20 bis, to enable it to resist the friction of the chains. A sheet of lead should be set between each of these sheets of copper. The keel, after being sheathed with copper in the usual way, is fitted underneath with the wooden mountings M N O P, Figures 22, 23, 24, set end to end, and secured by the straps R S T, figs. 21, 22, 23, of soft metal. These mountings, of an average thickness of say about two and a half inches, are covered with cement and sheet lead, over which are laid sheets of copper I J K, figs. 22, 23, 24, of about one-twelfth of an inch in thickness, which are riveted together at the points corresponding with the wood. Neither nails nor screws of any kind should penetrate to the mountings, which form a false keel especially intended to protect the keel from injury in case of the vessel taking the ground. The sheathing applied as above described offers the double advantage of preserving the sailing qualities of iron or armor-plated vessels, and of protecting the hull from external injury. In order to protect the interior surfaces from oxidation a layer of cement is applied within to the bottom of the vessel, as also to those parts of the inner walls which correspond with the coal-bunkers. The surfaces thus prepared are afterwards covered with Portland cement, a layer of from one-half to two-thirds of an inch being sufficient for the coal-bunkers. The bottoms, however, should receive a solid bed of this cement to the height of the fashion-pieces, a channel-way being formed in the middle to carry off the water.

*Special Tools.*

With a view to facilitate the sheathing process I have modified, as hereafter described, the construction of the braces and ratchet-keys employed therein, and have combined in one tool all the requisities for the proper action of the boring-bits.

Figures 25, 26, 27, represent different views and details of an iron brace, and Figure 30 a ratchet-key, each provided with the but-plate A B, seen apart in figs. 27, 28, and movable bracket C D, shown in Figure 29. By this arrangement both tools are enabled to drill in a normal line to the surface of the hull, even when this surface happens not to be parallel with the resting point of the toothed face of the plate A B.

The boring apparatus shown in Figures 31, 32, 33, 34, 35, is composed of the body A B C, adjustable to an ordinary hand-brace, and serving as mount to the following tools: firstly, a boring-bit, D E F; secondly, the pincers G H I; thirdly, the brush J K L A' for cleaning the teeth of the boring-bit, fitted to an iron rod provided with a spiral spring; and, fourthly, the pad M N O for the white paint, with which the position of the holes is marked. This pad, which is adjusted in the same manner as the brush, is of a circular form, as in P Q R, Figure 36, when used with the first bit, and of a crescent form, as in S T U, Figure 37, of larger diameter when used with the others.

It is scarcely necessary to observe that although I have obtained the best practical results from the tools above described, they may, if so desired, be replaced by others in the application of my mode of sheathing.

Having now fully described and ascertained the nature of my said improvements, and the manner of carrying them into effect, I would have it understood that I do not confine myself to the precise working details above laid down, as these may obviously be modified, according to circumstances, without deviating from the principles or main features of my invention.

But what I claim, and desire to secure by Letters Patent, is—

The application of copper sheathing to ships or vessels constructed of or plated with iron, in combination with interposed layers of insulating material, in manner and for the purposes substantially as herein set forth and represented in figs. 17 to 24 of the annexed drawings.

F. L. ROUX.

Witnesses:
 EDGAD CONGENBART,
 LE LIEVRE.